J. C. SWAN.
UNDERREAMER.
APPLICATION FILED OCT. 20, 1909.

997,718.

Patented July 11, 1911.
5 SHEETS—SHEET 1.

WITNESSES

INVENTOR
John C. Swan
by A. P. Greely
Attorney

J. C. SWAN.
UNDERREAMER.
APPLICATION FILED OCT. 20, 1909.

997,718.

Patented July 11, 1911.
5 SHEETS—SHEET 5.

WITNESSES:

INVENTOR
John C. Swan
BY
A. P. Greeley
Attorney

UNITED STATES PATENT OFFICE.

JOHN C. SWAN, OF MARIETTA, OHIO.

UNDERREAMER.

997,718.

Specification of Letters Patent.  Patented July 11, 1911.

Application filed October 20, 1909. Serial No. 523,707.

*To all whom it may concern:*

Be it known that I, JOHN C. SWAN, a citizen of the United States, residing at Marietta, in the county of Washington, State of Ohio, have invented certain new and useful Improvements in Underreamers, of which the following is a description, reference being had to the accompanying drawings, forming a part hereof.

My invention relates to devices for reaming out or enlarging well holes and particularly devices of such character intended for under-reaming, that is, reaming out or enlarging a well hole drilled below casing in order to make it large enough to permit the casing to be lowered into it.

My invention has for its object to provide a tool for effecting such reaming or under-reaming which shall be simple in construction, adapted to pass readily through casing without the necessity for special means for retaining the reaming bits or slips in collapsed position, shall be of the greatest possible strength and free from liability to clog or otherwise get out of order in use, in which the working parts may be readily removed and replaced and in which the movement of the reaming bits from expanded to collapsed position involves the least possible vertical movement.

With these and other objects hereinafter explained in view, my invention consists in the construction and combination of elements hereinafter described.

In the drawings: Fig. 8 is a bottom view of the cross-head by which the reaming bits are forced to expanded position.

In the drawings, 1 is the body of the under-reamer recessed in its lower portion to form housings 9 having their inner faces parallel and having in its lower portion between the housings a head block 2 having curved surfaces 3 adapted to receive and support reaming bits or slips 4 the inner faces 5 of which are concaved to fit the upper portion of the surfaces 3.

Figures 1, 3, 4, 5, 6, 7:
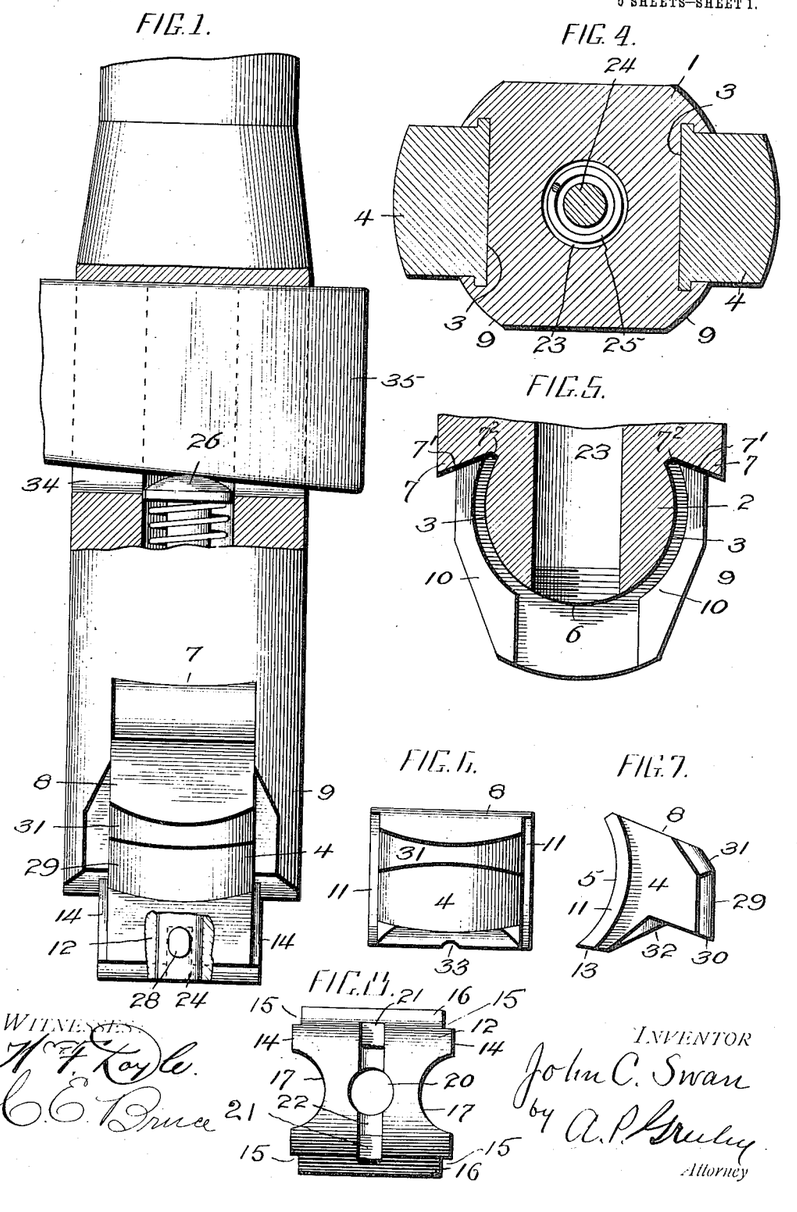
Figure 1 is an elevation partly broken away of an under-reamer embodying my invention.
Fig. 3 is a similar view showing the reaming bits or slips in expanded position.
Fig. 4 is a cross-section on line x—x of Fig. 3.
Fig. 5 is a longitudinal section of the lower portion of the reamer body.
Figs. 6 and 7 are respectively a front and side view of the reaming bits or slips.
Figures 2, 3:
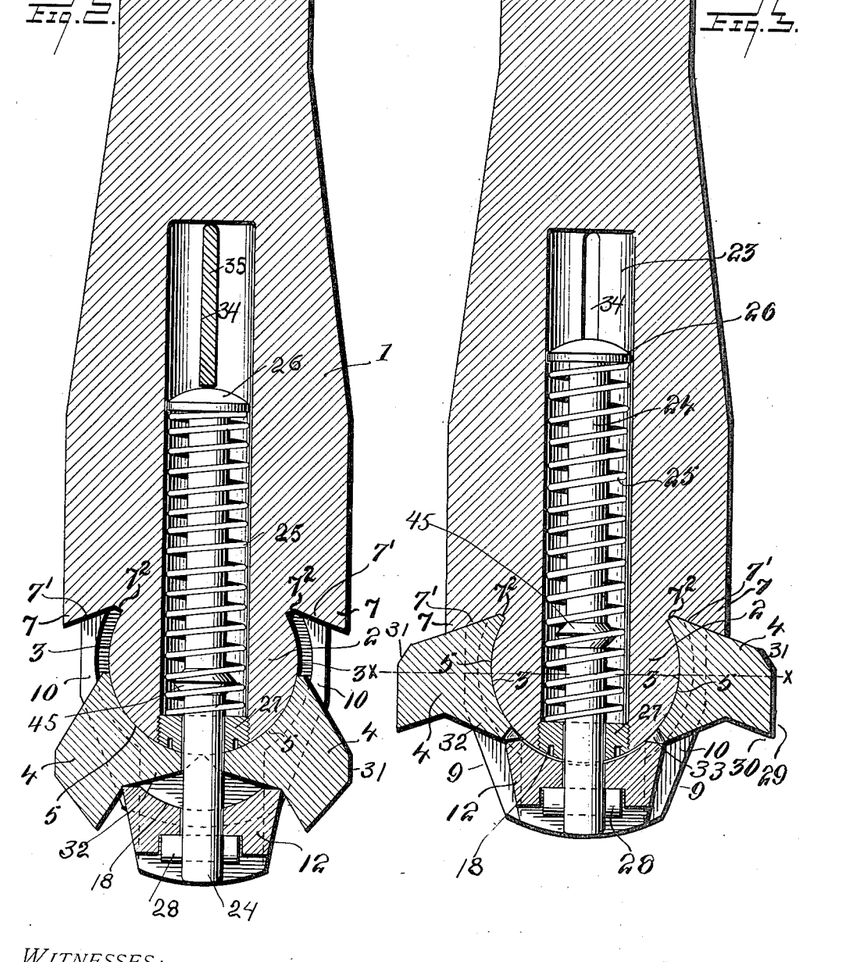
Fig. 2 is a vertical section of the under-reamer shown in Fig. 1, showing the reaming bits or slips in contracted position.
Figures 11, 12, 15, 16, 17, 18, 19, 20, 21:
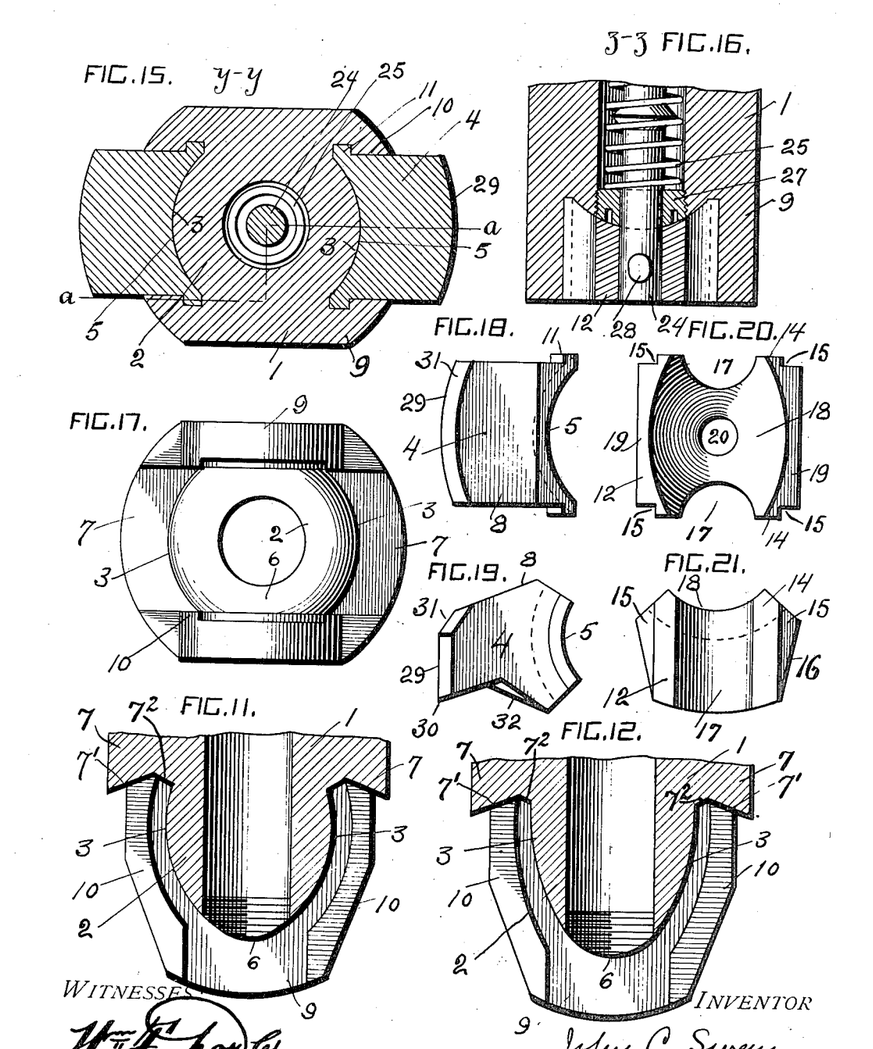
Fig. 11 is a vertical section of the lower portion of the reamer body showing the head block having its curved surfaces on the lines of an ellipse.
Fig. 12 is a similar view showing the head block having its curved surfaces on the lines of a parabola.
Fig. 15 is a cross-section on line y—y of Fig. 14.
Fig. 16 is a vertical section of the lower end of the reamer on line z—z of Fig. 14.
Fig. 17 is a bottom view of the reamer body shown in Figs. 13 and 14.
Figs. 18 and 19 show the reaming bit adapted for use with a ball or globe shaped head block in plan and elevation.
Figs. 20 and 21 show in plan and elevation the cross-head adapted for use with a ball or globe shaped head block.
Figures 13, 14:
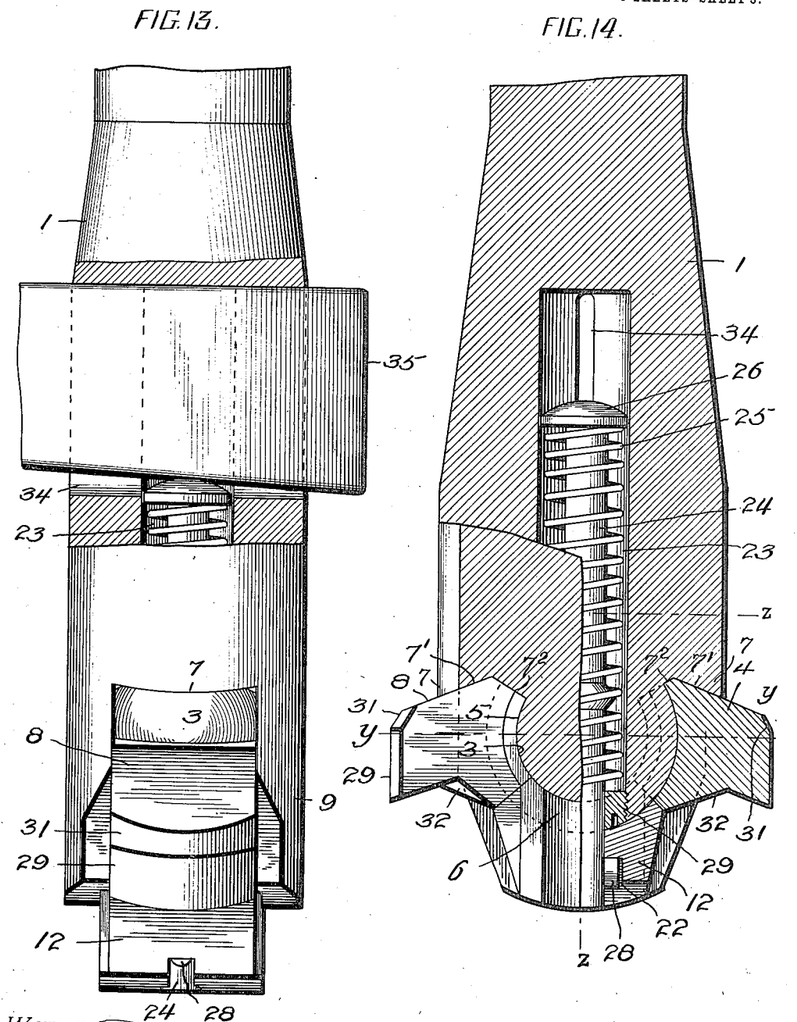
Fig. 13 is an elevation of a modification in which the surfaces of the head block are curved in two directions presenting the appearance of a ball or globe.
Fig. 14 is a vertical section of the construction shown in Fig 13 on line a—a of Fig. 15.

The surfaces 3, as shown in Figs. 2, 3 and 5, are formed on the arc of a circle but may be formed on the lines of an ellipse as shown in Fig. 11 or on the lines of a parabola as shown in Fig. 12, or may be formed as surfaces of a sphere, ellipsoid or paraboloid, as shown in Figs. 13, to 17 inclusive.

Whatever the curve of the surfaces 3 may be they are joined at their lower ends by a curved surface 6 which is continuous with them, and forms with them a continuous curve as shown. At the upper ends of the curved surfaces 3 of the head block are formed abutments 7 preferably with their faces oblique to the axial line of the reamer body, and the reaming bits or slips 4 have their upper ends 8 formed to fit the faces of the abutments.

The material of the reamer body 1 is extended downward at the sides of the curved surfaces 3 to form housings 9. These housings 9 are provided with guide ribs 10, the upper portions of which are preferably formed on the arc of a circle, the center of which is on the axial line of the reamer body if the head block is cylindrical and so located as to leave between them and the adjacent curved surfaces 3 a space adapted to receive the guide ribs 11 of one of the reaming bits or slips. The lower portions of the guide ribs 10 extend downward parallel with the axial line of the reamer body to form ways for a cross-head 12.

The cross-head 12 is in the form of a block rectangular in plan of a width suitable to fit between the lower ends of the housings 9 and of a length sufficient to extend into contact with the oblique faces 13 of the lower ends of the reaming bits or slips 4 when they are in expanded position. The sides 14, 14 of the cross head are parallel and are cut away at 15, 15 to fit the lower portions of the guide ribs 10. The ends 16, 16 of the cross head are preferably tapered downward as shown. The sides 14, 14 are preferably cut away at 17, 17 to reduce frictional contact with the walls of the housings 9 and to afford free passage for the water or dilute mud necessarily present in the well and in which the underreamer works. The upper face of the cross-head is concaved at 18 in its central portion on a curve corresponding to the curved surface 6 of the head block 2, and at its ends has oblique faces 19 adapted to fit the oblique faces 13 of the lower ends of the reaming heads or slips.

The cross-head is centrally bored out at 20 and is provided in its lower face, which is preferably convex as shown, with a longitudinal groove 21 extending across the central bore 20 and in the groove is a recess 22.

The reamer body is bored out axially at 23 to receive a spring rod 24 and spring 25. The spring 25 bears at its upper end against a head or shoulder 26 on the spring rod and at its lower end bears against a plug 27 which is preferably screw-threaded into the lower end of the bore 23 which is centrally bored to permit the spring rod to pass through it. The lower end of the spring rod, when the parts of the under-reamer are assembled, extends through the bore 20 of the cross head and is slotted to receive a pin 28 which is adapted to fit in the recess 22. The spring rod is provided midway its ends with a shoulder 45 of greater diameter than the bore of the plug 27.

The outer faces of the reaming bits are so formed as to present a lower portion 29 terminating at its lower edge in a cutting edge 30 adapted to cut away the material surrounding the hole drilled below the casing, the lower end of the reaming bits being inclined slightly upward from the cutting edge 30 inward so as to present a cutting edge of suitable shape. Above the lower portions 29 of the outer faces of the reaming bits are formed bearing faces 1 which incline upward and inward from the lower portion 29 of the outer face at such an angle that when the reaming bits are in collapsed position these bearing faces will be substantially vertical as shown in Fig. 2 and will be adapted to bear against the inner walls of the casing as the under-reamer is lowered or drawn up through it. The reaming bits are provided at their lower ends with an extension or tail piece 32 extending below the plane of the cutting edges 30 when the reaming bits are in expanded position and having its outer face inclined inward and downward at an angle oblique to the chord of the arc on which the concave inner face of the reaming bit is formed, that is oblique to a line joining the upper and lower ends of the inner face of a reaming bit. The extension or tail piece 32 terminates in an oblique face 13 inclined inward and upward from the outer or forward face. Centrally of the ends 13, the extensions or tail pieces 32 are recessed as shown at 33 to provide clearance space for the spring rod when the reaming bits are in collapsed position.

The length of the reaming bit or slip from the upper edge of the oblique upper end 8 to the oblique face 13 at the lower end is such as to fit readily between the lower portions of the guide ribs 10 so that when the cross head is removed the reaming bits or slips may each be readily inserted into the space in which the cross head fits when in position and slid onto the proper curved surfaces.

When the parts of the under-reamer are in position as shown in Fig. 3 the spring 25 pressing the spring rod 24 upward draws the cross block or cross-head 12 upward so that its oblique faces 19 bear against the oblique ends 13 of the reaming bits or slips holding them with their upper ends 8 against the abutments 7. When the cross block 12 is in this position its concave upper face 18 is nearly but not quite in contact with the curved surface 6 of the head block. The reaming bits or slips being thus in expanded position the tool is in condition for effecting the enlarging of a well hole. In order to introduce the under-reamer into the casing the reaming bits or slips must be collapsed, that is brought to such position that they will be wholly within a circle of the diameter of the interior of the casing. In order that this may be done it is necessary to force the spring rod 24 downward sufficiently to permit the cross block to withdraw from pressure contact with the reaming bits. In order to effect the forcing downward of the spring rod the reamer body is slotted at 34 through the upper end of the bore 23 and a wedge or drift 35 is inserted through this slot to bear against the upper end of the spring rod and force it downward by a wedging action as indicated in Fig. 1. When the reaming bits or slips are thus in collapsed position as shown in Fig. 2 the tool may be inserted in the upper end of the casing. As soon as the reaming bits or slips are within the casing the drift 35 is removed and the tool lowered through the casing, the faces 31 bearing against the walls of the casing and holding the reaming bits or slips in collapsed position, until the tool passes below the lower end of the casing when the reaming bits or slips are at once expanded to operating position by the spring.

In pulling out from below casing as the reamer body enters the casing the oblique faces 8 of the reaming bits or slips will be brought against the lower end of the casing and as the tool continues to move upward the lower end of the casing acting on these oblique faces will cause the reaming bits or slips to slide downward and inward, being guided by the ways 10 until the bearing faces 31 are in line with the interior of the casing when they will enter the casing and the tool may then be readily pulled upward through it.

Figure 9:
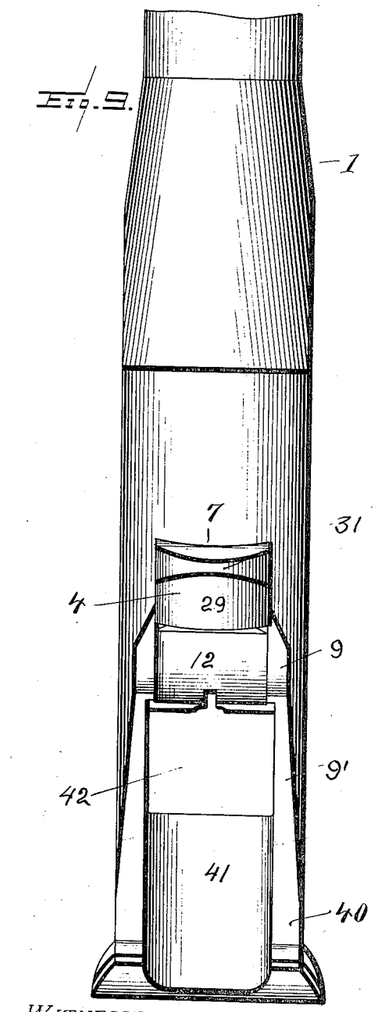
Figs. 9 and 10 are elevations of a combined under-reamer and bit embodying my invention, the two views being taken at right angles to each other.
Figure 10:
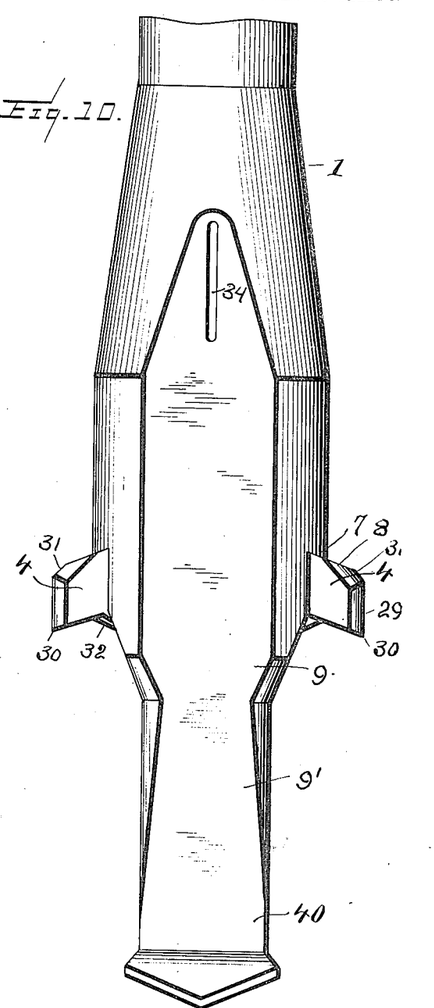

In Figs. 9 and 10 I have shown the under-reamer shown in Figs. 1 to 8 inclusive with a bit 40 of usual construction supported by downward extension 9' of the housings 9. The extensions 9' are connected by a web 41 and between the upper end of the web 41 and the lower ends of the guide ribs 10 a space 42 is left of sufficient size to permit the cross head 12 and the reaming bits or slips to be placed in position or removed.

In order to disassemble the under-reamer the spring rod 24 is first forced downward by the drift 35 sufficiently to move the pin 28 out of the recess 22 into line with the groove 21. The pin is then slipped out of its slot in the end of the spring rod. The cross head 12 may then be slipped off the end of the spring rod. The drift 35 is then removed to permit the spring rod to be drawn up by the spring 25 to be out of the way of the reaming bits or slips. The reaming bits or slips are then, one after the other, moved downward on the curved surfaces 3 onto the curved surfaces 6 into line with the space previously occupied by the cross head 12 and are moved through this space and removed.

In moving from expanded to collapsed position, or from collapsed to expanded position, the reaming bits have a movement which may be described as a rotary sliding movement as distinct from a pivotal movement, the reaming bits or slips not only swinging about a center but also having a distinct sliding movement, or movement of translation.

While the guide ribs 11 of the reaming bits or slips are preferably continuous as shown this is not absolutely necessary, it being essential only that they engage the guide ribs 10 at two points. No strain is brought on the guide ribs ordinarily in the operation of reaming in hard material. The upward acting force as the reaming bit strikes the shoulder to be cut away is sustained by the abutment 7 and by reason of the obliquity of the outer portion 7' of the face of the abutment this upward force is directed inward against the inner portion $7^2$ of the face of the abutment. The inward acting force due to the pinching in as the reaming bit cuts downward into the shoulder to be cut away is sustained by the curved surface 3 of the head block 2.

The tendency of the reaming bit to tilt through the pinching in action of the walls on it as it cuts downward into the shoulder to be cut away is resisted by the obliquity of the abutment 7. This inward acting force or pinching in action causes the reaming bit or slip of the shape shown to tend to act as a lever of which the force acts inward on the cutting edge, the fulcrum is the lower end of the inner face and the upper end of the inner face is the point at which the lever exerts the force imparted to it. By reason of the fact that the inner face of the reaming bit extends below the plane of the cutting edge the reaming bit is braced against any tendency to turn as it might do if its inner face terminated above the plane of or in the plane of the cutting edge. The downward extension of the inner face also facilitates the movement of the reaming bit on the curved surface 3 as the underreamer moves upward after striking a blow. The abutment 7 by reason of its obliquity and the mass of metal above and outside of the point at which the force of the lever is exerted is amply sufficient to prevent any actual lever movement of the reaming bit or slip.

The curved surfaces 3 being of the form shown, the head block supports the reaming bits when in expanded position in such a way that the pinching in action as the reaming bits strike a blow is sustained by the thickest portion of the supporting body, thus giving added resistance. By reason of the fact that the curved surfaces approach the axis of the reamer body at their upper ends the faces of the abutments can be extended farther toward the axis of the reamer body into the thicker portion of the reamer body, thus materially increasing the resistance of the abutments and decreasing the liability to deformity by the operation of the tool.

The curved surfaces 3 while affording ample support for the reaming bits when in expanded position, approach each other rapidly from the point of greatest thickness so that in moving from expanded position to collapsed position the reaming bits need to move only a very short distance vertically. This permits the spring to be made stronger than when a greater movement of the reaming bits and consequently greater expansion and contraction of the spring is required, and also permits the spring to exert nearly its full force when the reaming bits are against the abutments.

In the movement of the reaming bits from expanded position to collapsed position as in entering the lower end of the casing, or as the tool is drawn upward after striking a blow, they are guided by the guide ribs and their inner faces are not necessarily in contact with the curved surfaces 3. In this movement they necessarily push the cross head 12 downward but by reason of the inclined faces of the extensions 32 this is effected by a wedging action instead of by a direct push so that less force is necessary to collapse the reaming bits than where they are required to push downward in a direct line against the force of the spring.

By reason of the inclination of the outer faces of the extensions 32 no surface is presented for the lodgment of mud or solid material and in the movement of the reaming bits from expanded to collapsed position any material which by any possibility might be on these surfaces will be scraped off by the ends of the upper face of the cross head. The inclined ends of the cross head being tapered will also present no surface for lodgment of mud and as the cross head fills the space between the lower ends of the reaming bits and overlap their lower ends, there is no possibility of clogging the tool.

The cross head being guided in its movement by the lower ends of the housings and by the lower ends of the guide ribs, cannot have lateral movement in any direction and serves to prevent lateral strain from being brought on the spring rod. The shoulder 45 on the spring rod is so located that while the spring rod may descend sufficiently to permit the cross head to be detached for removal, it will strike the plug 27 before the cross head will pass below the lower end of the housing when the tool is in use, thus preventing accidental detachment of the parts should the spring be broken.

In the modification shown in Fig. 11 the curved surfaces 3 of the head block are shown as surfaces of a solid which in cross-section is elliptical and Fig. 12 shows a head block the curved surfaces 3 of which are those of a solid which in cross-section is parabolic. Either of these forms of head block are well adapted for use. The upper portions of the guide rib 10 may be formed on lines parallel with the curved surfaces 3 where either of these two forms of head block are used but these upper portions of the guide ribs 10 are preferably formed on the arc of a circle larger than the circle on which these ribs are formed when the head block is a section of a cylinder.

In the several forms of head block above described the curved surfaces 3 are curved in one way only and extend in straight lines between pairs of housings 9. In other words the head block shown in Figs. 1, 2, 3 and 5 is in effect a section of a cylinder, and the head blocks shown in Figs. 11 and 12 are each sections of a body having the straight sides of a cylinder but having in cross-section a form which differs somewhat from a cylinder. For reamers for sizes from 8 inches upward I prefer to form the head block to correspond with one or the other of the three forms above described as in these large sizes the mass of metal of the abutment 7 and of the housings 9 is ample to resist any possible strain. But in small sizes it is desirable to give the head block the form of a section of a sphere or ellipsoid or paraboloid, that is to give the curved surfaces 3 curvature in two directions. Such construction is illustrated in Figs. 13 to 21 inclusive, the head block in these figures being shown as having the shape of a portion of a ball, globe or sphere, it being understood that the head block may if preferred have the shape of a portion of an ellipsoid or of a paraboloid. In such construction the portions of the curved surfaces 3 near the housings approach the axial line of the reamer body while on a plane midway between the housings the head block has the greatest thickness possible without lessening the thickness of the reaming bits. The guide ribs 10 may therefore be of greater width than would be possible with a cylindrical head block and the spaces between these guide ribs and the curved surfaces 3 may be located in thicker metal. This construction also permits the faces of the abutments 17 to extend, at points near the housings, deeper into the mass of the metal of the reamer body than would be possible if the head block is cylindrical. The inner faces of the reaming bits in this modified construction are necessarily concave on two axes so as to present a cup shape as shown in Figs. 18 and 19. The upper face of the cross block is also necessarily cup shaped as shown in Figs. 20 and 21. The operation of the parts in this modified form is the same as in the form shown in Figs. 1 to 12 inclusive.

It should be understood that the term "reaming bit" as used herein is not to be understood as being restricted to the precise form of reaming bit shown and described but is to be understood as including any form of bit, cutter or slip adapted for movement on the bearing surfaces on the reamer body and having its outer lower edge, whether formed on a portion integral with the body of the reaming bit or otherwise, adapted to serve as a cutting edge to cut away the material surrounding the hole drilled below casing.

By forming the lower end of the head block with a curved surface 6 as shown and as above described as the preferred construction, a continuous bearing surface is presented for the reaming bit in its movement downward into position to be removed, facilitating its movement into and out of operating position, but it will of course be understood that it is essential only that the head block shall have the surfaces 3, 3 to receive the reaming bits and sustain the inward pressure upon them in the reaming operation, and that the precise form of the lower end of the head block is immaterial so long as it is such as to permit the reaming bits to be moved into collapsed position.

It will of course be understood that I do not desire to be limited to precise details of construction or arrangement of parts, as it is obvious that many changes in details of construction and form and arrangement may be made without departing from the spirit of the invention.

Having thus described my invention, what I claim and desire to secure by Letters Patent is:—

1. In an underreamer, the combination of a reamer body, a head block carried by the reamer body having curved surfaces adapted to receive and sustain reaming bits; reaming bits movable on said curved surfaces having their rear faces correspondingly curved, said rear faces being extended below the plane of the cutting edges and adapted to contact with said curved surfaces below said plane.

2. In an underreamer, the combination of a reamer body, a head block carried by the reamer body having convex curved surfaces adapted to receive and sustain reaming bits, reaming bits movable on said curved surfaces having their rear faces concaved said rear faces being extended below the plane of the cutting edges and adapted to contact with said curved surfaces below said plane.

3. In an underreamer, the combination of a reamer body, a head block carried by the reamer body having convex curved surfaces adapted to receive and sustain reaming bits, and reaming bits movable on said curved surfaces having extensions projecting below the plane of their cutting edges, and having inclined outer faces, the rear faces of the reaming bits being concaved and adapted to contact with said curved surfaces below the plane of the cutting edges of said reaming bits.

4. In an underreamer, the combination of a reamer body, a head block carried by the reamer body having convex curved surfaces adapted to receive and sustain reaming bits, and reaming bits movable on said curved surfaces, having extensions projecting below the plane of their cutting edges, the rear faces of the reaming bits being concaved and adapted to contact with said curved surfaces below the plane of the cutting edges of said reaming bits, the forward faces of the extensions being oblique to the chord of the arc of the curve of the inner faces of said reaming bits.

5. In an underreamer, the combination of a reamer body, a head block carried by the reamer body having curved surfaces adapted to receive and sustain reaming bits, abutments at the upper ends of the curved surfaces, and reaming bits movable on said curved surfaces into contact with said abutments having their rear faces concaved.

6. In an underreamer, the combination of a reamer body, a head block carried by the reamer body having curved surfaces adapted to receive and sustain reaming bits, abutments at the upper ends of the curved surfaces, and reaming bits movable on said curved surfaces into contact with said abutments having their rear faces concaved, said rear faces being extended below the plane of the cutting edges and adapted to contact with said curved surfaces below said plane.

7. In an underreamer, the combination of a reamer body, a head block carried by the reamer body having curved surfaces adapted to receive and sustain reaming bits, oblique abutments at the upper ends of the curved surfaces, and reaming bits movable on said curved surfaces having their rear faces concaved.

8. In an underreamer, the combination of a reamer body, a head block carried by the reamer body having curved surfaces adapted to receive and sustain reaming bits, oblique abutments at the upper ends of the curved surfaces, and reaming bits movable on said curved surfaces having their rear faces concaved said rear faces being extended below the plane of the cutting edges and adapted to contact with said curved surfaces below said plane.

9. In an underreamer the combination of a reamer body, a head block carried by the reamer body having curved surfaces adapted to receive and sustain reaming bits, abutments at the upper ends of the curved surfaces having the inner portions of their faces formed at substantially right angles to the resultant of the blow of the reaming bit on the material to be cut away by it, and having the outer portions of their faces at an angle to their inner faces, and reaming bits movable on said curved surfaces having their rear faces concaved and having their upper ends adapted to contact with said abutments.

10. In an underreamer, the combination of a reamer body, a head block carried by the reamer body having curved surfaces adapted to receive and sustain reaming bits, abutments at the upper ends of the curved surfaces having the inner portions of their faces formed at substantially right angles to the resultant of the blow of the reaming bit on the material to be cut away by it, and having the outer portions of their faces at an angle to their inner faces and oblique to the axial line of the reamer body, and reaming bits movable on said curved surfaces having their rear faces concaved and having their upper ends adapted to contact with said abutments.

11. In an underreamer, the combination of a reamer body, a head block carried by the reamer body having curved surfaces adapted to receive and sustain reaming bits, oblique abutments at the upper ends of the curved surfaces, and reaming bits movable on said curved surfaces having oblique upper ends adapted to contact with said oblique abutments and having their rear faces concaved.

12. In an underreamer, the combination of a reamer body, a head block carried by the reamer body having curved surfaces adapted to receive and sustain reaming bits, oblique abutments at the upper ends of the curved surfaces, and reaming bits movable on said curved surfaces having oblique upper ends adapted to contact with said oblique abutments and having their rear faces concaved, said rear faces being extended below the plane of the cutting edges and adapted to contact with said curved surfaces below said plane.

13. In an underreamer, the combination of a reamer body, a head block carried by the reamer body having its greatest thickness below its upper end and having convex curved surfaces adapted to receive and sustain reaming bits, and reaming bits movable on said curved surfaces having their rear faces concaved, said rear faces being extended below the plane of the cutting edges and adapted to contact with said curved surfaces below said plane.

14. In an underreamer, the combination of a reamer body, a head block carried by the reamer body having its greatest thickness below its upper end and having convex curved surfaces adapted to receive and sustain reaming bits, abutments at the upper ends of the curved surfaces, and reaming bits movable on said curved surfaces having their rear faces concaved.

15. In an underreamer, the combination of a reamer body, a head block carried by the reamer body having its greatest thickness below its upper end and having convex curved surfaces adapted to receive and sustain reaming bits, abutments at the upper ends of the curved surfaces, and reaming bits movable on said curved surfaces having their rear faces concaved, said rear faces being extended below the plane of the cutting edges and adapted to contact with said curved surfaces below said plane.

16. In an underreamer, the combination of a reamer body, a head block carried by the reamer body having its greatest thickness below its upper end and having convex curved surfaces adapted to receive and sustain reaming bits, oblique abutments at the upper ends of the curved surfaces, and reaming bits movable on said curved surfaces having their upper ends oblique to contact with the abutments and having their rear faces concaved.

17. In an underreamer the combination of a reamer body, a head block carried by the reamer body having its greatest thickness below its upper end and having convex curved surfaces adapted to receive and sustain reaming bits, abutments at the upper ends of the curved surfaces having the inner portions of their faces formed at substantially right angles to the resultant of the blow of the reaming bit on the material to be cut away by it, and having the outer portions of their faces at an angle to the inner portions of their faces, and reaming bits movable on said curved surfaces having their upper ends adapted to contact with the abutments and having their rear faces concaved.

18. In an underreamer, the combination of a reamer body, a head block carried by the reamer body having its greatest thickness below its upper end and having convex curved surfaces adapted to receive and sustain reaming bits, oblique abutments at the upper ends of the curved surfaces, reaming bits movable on said curved surfaces having their upper ends oblique to contact with the abutments and having their rear faces concaved, said rear faces being extended below the plane of the cutting edges and adapted to contact with said curved surfaces below said plane.

19. In an underreamer, the combination of a reamer body, a head block carried by the reamer body having curved surfaces adapted to receive and sustain reaming bits, abutments at the upper ends of the curved surfaces, and reaming bits movable on said curved surfaces having their rear faces concaved and having extensions projecting below the plane of their cutting edges adapted to contact with the curved surfaces, and means for moving the reaming bits into contact with the abutments.

20. In an underreamer, the combination of a reamer body, a head block carried by the reamer body having curved surfaces adapted to receive and sustain reaming bits, abutments at the upper ends of the curved surfaces, reaming bits movable on said curved surfaces having their rear faces concaved, and means for moving the reaming bits into contact with the abutments.

21. In an underreamer, the combination of a reamer body, a head block carried by the reamer body having curved surfaces adapted to receive and sustain reaming bits, abutments at the upper ends of the curved surfaces, reaming bits movable on said curved surfaces having their rear faces concaved to contact with the curved surfaces, and means arranged to act against the lower ends of the reaming bits for moving them into contact with the abutments.

22. In an underreamer, the combination of a reamer body, a head block carried by the reamer body having curved surfaces adapted to receive and sustain reaming bits, abutments at the upper ends of the curved surfaces, reaming bits movable on said curved surfaces having their rear faces concaved and having extensions projecting below the plane of their cutting edges adapted to contact with the curved surfaces, and means arranged to act against said extensions for moving the reaming bits into contact with the abutments.

23. In an underreamer, the combination of a reamer body, a head block carried by the reamer body having convex curved surfaces adapted to receive and sustain reaming bits, reaming bits movable on said curved surfaces having extensions projecting below the plane of their cutting edges, the rear faces of the reaming bits being concaved and adapted to contact with said curved surfaces below the plane of the cutting edges, the forward faces of the extensions being oblique to the chord of the arc of the concaved rear faces, and means arranged to act against said extensions to move the reaming bits on the curved surfaces.

24. In an underreamer, the combination of a reamer body, a head block carried by the reamer body having convex curved surfaces adapted to receive and sustain reaming bits, abutments at the upper ends of the curved surfaces, and reaming bits movable on said curved surfaces having extensions projecting below the plane of their cutting edges, the rear faces of the reaming bits being concaved and adapted to contact with said curved surfaces, and the forward faces of the extensions being oblique to the chord of the arc of the concaved rear faces, and means arranged to act against said extensions to move the reaming bits on the curved surfaces into contact with the abutments.

25. In an underreamer, the combination of a reamer body, a head block carried by the reamer body having convex curved surfaces adapted to receive and sustain reaming bits, abutments at the upper ends of the curved surfaces, reaming bits movable on said curved surfaces having extensions projecting below the plane of their cutting edges, the rear faces of the reaming bits being concaved and adapted to contact with said curved surfaces below the plane of their cutting edges, the forward faces of the extensions being oblique to the chord of the arc of the concaved rear faces, and means arranged to act against said extensions to move the reaming bits on the curved surfaces into contact with the abutments.

26. In an underreamer, the combination of a reamer body, a head block carried by the reamer body having its greatest thickness below its upper end and having convex curved surfaces adapted to receive and sustain reaming bits, abutments at the upper ends of the curved surfaces, reaming bits movable on said curved surfaces, the rear faces of the reaming bits being concaved and adapted to contact with said curved surfaces, and means for moving the reaming bits on the curved surfaces into contact with the abutments.

27. In an underreamer, the combination of a reamer body, a head block carried by the reamer body having its greatest thickness below its upper end and having convex curved surfaces adapted to receive and sustain reaming bits, abutments at the upper ends of the curved surfaces, reaming bits movable on said curved surfaces having extensions projecting below the plane of their cutting edges, the rear faces of the reaming bits being concaved and adapted to contact with said curved surfaces below the plane of the cutting edges, and means for moving the reaming bits on the curved surfaces into contact with the abutments.

28. In an underreamer, the combination of a reamer body, a head block carried by the reamer body having its greatest thickness below its upper end and having convex curved surfaces adapted to receive and sustain reaming bits, abutments at the upper ends of the curved surfaces, reaming bits movable on the curved surfaces, the rear faces of the reaming bits being concaved and adapted to contact with said curved surfaces, and means arranged to act against the lower ends of the reaming bits for moving them on the curved surfaces into contact with the abutments.

29. In an underreamer, the combination of a reamer body, a head block carried by the reamer body having its greatest thickness below its upper end and having convex curved surfaces adapted to receive and sustain reaming bits, abutments at the upper ends of the curved surfaces, reaming bits movable on said curved surfaces having extensions projecting below the plane of their cutting edges, the rear faces of the reaming bits being concaved and adapted to contact with said curved surfaces below the plane of their cutting edges, and means arranged to act against the extensions of the reaming bits for moving the reaming bits on the curved surfaces into contact with the abutments.

30. In an underreamer, the combination of a reamer body, a head block carried by the reamer body having convex curved surfaces adapted to receive and sustain reaming bits and having its lower end terminating in a curved surface continuous with said curved surfaces, reaming bits movable on said curved surfaces having their rear faces concaved, and having extensions projecting below the plane of their cutting edges, and means for moving the reaming bits on the curved surfaces.

31. In an underreamer, the combination of a reamer body, a head block carried by the reamer body having its greatest thickness below its upper end and having convex curved surfaces adapted to receive and sustain reaming bits and having its lower end terminating in a curved surface continuous with said curved surfaces, and reaming bits movable on said curved surfaces having their rear faces concaved, and having extensions projecting below the plane of their cutting edges, and means for moving the reaming bits on the curved surfaces.

32. In an underreamer, the combination of a reamer body, a head block carried by the reamer body having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved, and means for moving the reaming bits on the curved surfaces into contact with the abutments.

33. In an underreamer, the combination of a reamer body, a head block carried by the reamer body having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved and having extensions projecting below the plane of their cutting edges, and means for moving the reaming bits on the curved surfaces into contact with the abutments.

34. In an underreamer, the combination of a reamer body, a head block carried by the reamer body having its greatest thickness below its upper end and having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved, and means for moving the reaming bits on the curved surfaces into contact with the abutments.

35. In an underreamer, the combination of a reamer body, a head block carried by the reamer body having its greatest thickness below its upper end and having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved and having extensions projecting below the plane of their cutting edges, and means for moving the reaming bits on the curved surfaces into contact with the abutments.

36. In an underreamer, the combination of a reamer body, a head block carried by the reamer body having convex curved surfaces adapted to receive and sustain reaming bits, and having its lower end terminating in a curved surface continuous with said curved surfaces, reaming bits movable on said curved surfaces having their rear faces concaved, and having extensions projecting below the plane of their cutting edges, and means arranged to act against said extensions for moving the reaming bits on the curved surfaces.

37. In an underreamer, the combination of a reamer body, a head block carried by the reamer body having its greatest thickness below its upper end and having convex curved surfaces adapted to receive and sustain reaming bits, and having its lower end terminating in a curved surface continuous with said curved surfaces, reaming bits movable on said curved surfaces having their rear faces concaved, and having extensions projecting below the plane of their cutting edges, and means arranged to act against said extensions for moving the reaming bits on the curved surfaces.

38. In an underreamer, the combination of a reamer body, a head block carried by the reamer body having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved and having extensions projecting below the plane of their cutting edges, and means arranged to act against said extensions for moving the reaming bits on the curved surfaces.

39. In an underreamer the combination of a reamer body, a head block carried by the reamer body having its greatest thickness below its upper end and having convex curved surfaces adapted to receive and sustain reaming bits, and having its lower end terminating in a curved surface continuous with said curved surfaces, abutments at the upper ends of the curved surfaces, reaming bits movable on said curved surfaces having their rear faces concaved, and means arranged to act against said reaming bits to move them on the curved surfaces.

40. In an underreamer, the combination of a reamer body, a head block carried by the reamer body having its greatest thickness below its upper end and having convex curved surfaces adapted to receive and sustain reaming bits, and having its lower end terminating in a curved surface continuous with said curved surfaces, abutments at the upper ends of said curved surfaces, reaming bits movable on said curved surfaces having their rear faces concaved, and having extensions projecting below the plane of their cutting edges, and means arranged to act against said extensions for moving the reaming bits on the curved surfaces.

41. In an underreamer, the combination of a reamer body, a head block carried by the reamer body having convex curved surfaces adapted to receive and sustain reaming bits, reaming bits movable on said curved surfaces having their rear faces concaved and adapted to contact with said curved surfaces, a cross-head below the reaming bits having its ends arranged to bear against the under side of the reaming bits, and means for forcing the cross head upward to move the reaming bits on the curved surfaces.

42. In an underreamer, the combination of a reamer body, a head block carried by the reamer body having convex curved surfaces adapted to receive and sustain reaming bits, reaming bits movable on said curved surfaces having extensions projecting below the plane of their cutting edges, the rear faces of the reaming bits being concaved and adapted to contact with said curved surfaces below the plane of the cutting edges, a cross head below the reaming bits having its ends arranged to bear against the under side of the reaming bits and means for forcing the cross head upward to move the reaming bits on the curved surfaces.

43. In an underreamer, the combination of a reamer body, a head block carried by the reamer body having convex curved surfaces adapted to receive and sustain reaming bits, reaming bits movable on said curved surfaces, having their rear faces concaved and adapted to contact with said curved surfaces, a cross head below the reaming bits having its ends arranged to bear against the under sides of the reaming bits, and yielding means for forcing the cross head upward to move the reaming bits on the curved surfaces.

44. In an underreamer, the combination of a reamer body, a head block carried by the reamer body having convex curved surfaces adapted to receive and sustain reaming bits, reaming bits movable on said curved surfaces, having extensions projecting below the plane of their cutting edges, the rear faces of the reaming bits being concaved and adapted to contact with said curved surfaces below the plane of their cutting edges, a cross head below the reaming bits having its ends arranged to bear against the under side of the reaming bits, and yielding means for forcing the cross head upward to move the reaming bits on the curved surfaces.

45. In an underreamer, the combination of a reamer body, a head block carried by the reamer body having convex curved surfaces adapted to receive and sustain reaming bits, reaming bits movable on said curved surfaces having extensions projecting below the plane of their cutting edges, the rear faces of the reaming bits being concaved and adapted to contact with said curved surfaces, the outer faces of the extensions being oblique to the chord of the curve of the rear face of the reaming bit, a cross head below the reaming bits having its ends arranged to bear against the oblique faces of the extensions of the reaming bits, and means for forcing the cross head upward to move the reaming bits on the curved surfaces.

46. In an underreamer, the combination of a reamer body, a head block carried by the reamer body having convex curved surfaces adapted to receive and sustain reaming bits, reaming bits movable on said curved surfaces having extensions projecting below the plane of their cutting edges, the rear faces of the reaming bits being concaved and adapted to contact with said curved surfaces below the plane of their cutting edges, the forward faces of the extensions being oblique to the chord of the arc of the curve of the rear face of the reaming bit, a cross head below the reaming bits having its ends arranged to bear against the oblique faces of the extensions of the reaming bits, and yielding means for forcing the cross head upward to move the reaming bits on the curved surfaces.

47. In an underreamer, the combination of a reamer body, a head block carried by the reamer body having convex curved surfaces adapted to receive and sustain reaming bits and having its lower end terminating in a curved surface continuous with said curved surfaces, reaming bits movable on said curved surfaces having their rear faces concaved, a cross head below the lower end of the head block having its ends arranged to bear against the lower ends of the reaming bits, and concaved on its upper face to correspond with the curved surface of the lower end of the head block, and means for forcing the cross head upward to move the reaming bits on the curved surfaces.

48. In an underreamer, the combination of a reamer body, a head block carried by the reamer body having convex curved surfaces adapted to receive and sustain reaming bits and having its lower end terminating in a curved surface continuous with said curved surfaces, reaming bits movable on said curved surfaces having their rear faces concaved, and having extensions projecting below the plane of their cutting edges, a cross head below the lower end of the head block having its ends arranged to bear against the extensions of the reaming bits and concaved on its upper face to correspond with the curved surface of the lower end of the head block, and means for forcing the cross head upward to move the reaming bits on the curved surfaces.

49. In an underreamer, the combination of a reamer body, a head block carried by the reamer body having its greatest thickness below its upper end and having convex curved surfaces adapted to receive and sustain reaming bits, and having its lower end terminating in a curved surface continuous with said curved surfaces, reaming bits movable on said curved surfaces having their rear faces concaved, a cross head below the lower end of the head block having its ends arranged to bear against the lower ends of the reaming bits, and concaved on its upper face to correspond with the curved surface of the lower end of the head block, and means for forcing the cross head upward to move the reaming bits on the curved surfaces.

50. In an underreamer, the combination of a reamer body, a head block carried by the reamer body having its greatest thickness below its upper end and having convex curved surfaces adapted to receive and sustain reaming bits and having its lower end terminating in a curved surface continuous with said curved surfaces, reaming bits movable on said curved surfaces having their rear faces concaved and having extensions projecting below the plane of their cutting edges, a cross head below the lower end of the head block having its ends arranged to bear against the extensions of the reaming bits, and concaved on its upper face to correspond with the curved surface of the lower end of the head block, and means for forcing the cross head upward to move the reaming bits on the curved surfaces.

51. In an underreamer, the combination of a reamer body, a head block carried by the reamer body having convex curved surfaces adapted to receive and sustain reaming bits, and having its lower end terminating in a curved surface continuous with said curved surfaces, reaming bits movable on said curved surfaces having their rear faces concaved, and having extensions projecting below the plane of their cutting edges, the lower faces of the extensions being oblique to the chord of the arc of the curve of the rear face of the reaming bit, a cross head below the lower end of the head block hav-ing the ends of its upper face arranged to bear against the oblique faces of the extensions of the reaming bits, and yielding means for forcing the cross head upward for moving the reaming bits on the curved surfaces.

52. In an underreamer, the combination of a reamer body, a head block carried by the reamer body having its greatest thickness below its upper end and having convex curved surfaces adapted to receive and sustain reaming bits and having its lower end terminating in a curved surface continuous with said curved surfaces, reaming bits movable on said curved surfaces having their rear faces concaved and having extensions projecting below the plane of their cutting edges, the lower faces of the extensions being oblique to the chord of the arc of the curve of the rear face of the reaming bit, a cross head below the lower end of the head block having the ends of its upper face arranged to bear against the oblique faces of the extensions of the reaming bits and yielding means for forcing the cross head upward to move the reaming bits on the curved surfaces.

53. In an underreamer, the combination of a reamer body, a head block carried by the reamer body having convex curved surfaces adapted to receive and sustain reaming bits, reaming bits movable on said curved surfaces having their rear faces concaved and having extensions projecting below the plane of their cutting edges, the lower faces of the extensions being oblique to the chord of the arc of the curve of the rear face of the reaming bit, a cross head below the lower end of the head block adapted to fill the space between the lower ends of the extensions of the reaming bits and to bear against said extensions, the faces of the ends of the cross head being oblique to its vertical axis, and yielding means for forcing the cross head upward.

54. In an underreamer, the combination of a reamer body, a head block carried by the reamer body having curved surfaces adapted to receive and sustain reaming bits, abutments at the upper ends of the curved surfaces, reaming bits movable on said curved surfaces, means independent of said curved surfaces for guiding the reaming bits in their movement, and yielding means for moving the reaming bits into contact with the abutments.

55. In an underreamer, the combination of a reamer body, a head block carried by the reamer body having curved surfaces adapted to receive and sustain reaming bits, abutments at the upper ends of the curved surfaces having oblique faces, reaming bits movable on said curved surfaces and having oblique upper ends adapted to fit the oblique faces of the abutments, means independent of said curved surfaces for guiding the reaming bits in their movement, and yielding means for moving the reaming bits into contact with the abutments.

56. In an underreamer, the combination of a reamer body, a head block carried by the reamer body having curved surfaces adapted to receive and sustain reaming bits, abutments at the upper ends of the curved surfaces having the outer and inner portions of their faces arranged at different angles, reaming bits movable on said curved surfaces and having their upper ends adapted to fit the faces of the abutments, and means for moving the reaming bits into contact with the abutments.

57. In an underreamer, the combination of a reamer body, a head block carried by the reamer body having curved surfaces adapted to receive and sustain reaming bits, abutments at the upper ends of the curved surfaces having the inner and outer portions of their faces at different angles and having the inner portions of their faces arranged at substantially right angles to the resultant of the blow of the reaming bit on the material to be cut away by it, reaming bits movable on said curved surfaces and having their upper ends adapted to fit the faces of the abutments, and means for moving the reaming bits into contact with the abutments.

58. In an underreamer, the combination of a reamer body, a head block carried by the reamer body having curved surfaces adapted to receive and sustain reaming bits, abutments at the upper ends of the curved surfaces having the outer and inner portions of their faces at different angles both portions of their faces being formed on angles oblique to the axial line of the reamer body, reaming bits movable on said curved surfaces and having their upper ends adapted to fit the oblique faces of the abutments, and means for moving the reaming bits into contact with the abutments.

59. In an underreamer, the combination of a reamer body recessed in its lower portion to form opposite housings, a head block between the housings having curved surfaces adapted to receive and sustain reaming bits, abutments at the upper ends of the curved surfaces, guide ribs on the housings for guiding the reaming bits, reaming bits movable on said curved surfaces having means for engaging said guide ribs, and means for moving the reaming bits into contact with said abutments.

60. In the underreamer, the combination of a reamer body, a head block carried by the reamer body having opposite curved surfaces adapted to receive and sustain reaming bits, reaming bits movable on said curved surfaces, means for guiding the reaming bits in their movement on said curved surfaces, said guiding means being omitted at the lower end of the head block for a space equal to the length of the reaming bit, abutments at the upper ends of said curved surfaces, and means for moving the reaming bits into contact with the abutments.

61. In an underreamer, the combination of a reamer body, a head block carried by the reamer body having opposite curved surfaces adapted to receive and sustain reaming bits, and having its lower end terminating in a curved surface continuous with said curved surfaces, reaming bits movable on said curved surfaces, means for guiding the reaming bits in their movement on said curved surfaces, said guiding means being omitted at the lower end of the head block for a space equal to the length of the reaming bits, abutments at the upper ends of said curved surfaces, and means for moving the reaming bits into contact with the abutments.

62. In an underreamer, the combination of a reamer body, a head block carried by the reamer body having opposite curved surfaces adapted to receive and sustain reaming bits, reaming bits movable on said curved surfaces, means for guiding the reaming bits in their movement on said curved surfaces, said guiding means being omitted at the lower end of the head block for a space equal to the length of the reaming bits, abutments at the upper ends of said curved surfaces, and yielding means for moving the reaming bits into contact with the abutments.

63. In an underreamer, the combination of a reamer body, a head block carried by the reamer body having opposite curved surfaces adapted to receive and sustain reaming bits and having its lower end terminating in a curved surface continuous with said curved surfaces, reaming bits movable on said curved surfaces, means for guiding the reaming bits in their movement on said curved surfaces, said guiding means being omitted at the lower end of the head block for a space equal to the length of the reaming bits, abutments at the upper ends of said curved surfaces, and yielding means for moving the reaming bits into contact with the abutments.

64. In an underreamer, the combination of a reamer body, recessed in its lower portion to form opposite housings, a head block between the housings having opposite curved surfaces adapted to receive and sustain reaming bits, abutments at the upper ends of the curved surfaces, reaming bits movable on said curved surfaces, guide ribs on the housings having their upper portions coextensive with said curved surfaces and having their lower portions extending downward from the lower ends of said curved surfaces, the space between the guide ribs adjacent opposite curved surfaces being equal to the length of a reaming bit, and means for moving the reaming bits into contact with the abutments.

65. In an underreamer, the combination of a reamer body recessed in its lower portion to form opposite housings, a head block between the housings having opposite curved surfaces adapted to receive and sustain reaming bits, abutments at the upper ends of the curved surfaces, said head block having its lower end formed on a curve continuous with said curved surfaces, reaming bits movable on said curved surfaces, guide ribs on the housings having their upper portions coextensive with said curved surfaces and having their lower portions extending downward from the lower ends of said curved surfaces, the space between the guide ribs adjacent opposite curved surfaces being equal to the length of a reaming bit, and means for moving the reaming bits into contact with the abutments.

66. In an underreamer, the combination of a reamer body recessed in its lower portion to form opposite housings, a head block between the housings having opposite curved surfaces adapted to receive and sustain reaming bits, abutments at the upper ends of the curved surfaces, reaming bits movable on said curved surfaces, a cross head opposite the lower end of the head block, and movable toward and from it, said cross head adapted to bear against the lower surfaces of the reaming bits, means for guiding the reaming bits in their movement on the curved surfaces, and means for moving the cross head against the reaming bits to move them into contact with the abutments.

67. In an underreamer, the combination of a reamer body, a head block carried by the reamer body having opposite curved surfaces adapted to receive and sustain reaming bits, reaming bits movable on said curved surfaces having their rear faces concaved, a cross head opposite the lower end of the head block and movable toward and from it, said cross head being adapted to bear against said reaming bits from below, a spring rod and spring carried by the reamer body, and a detachable connection between the spring rod and cross head.

68. In an underreamer, the combination of a reamer body having a central bore, a head block carried by the reamer body having curved surfaces adapted to receive and sustain reaming bits, reaming bits movable on said curved surfaces having their rear faces concaved, a cross head engaging the reaming bits from below, a spring rod extending into the central bore of the reamer body, a spring within said central bore arranged to force the spring rod upward, and means for preventing lateral movement of the cross head.

69. In an underreamer, the combination of a reamer body having a central bore, a head block carried by the reamer body having curved surfaces adapted to receive and sustain reaming bits, reaming bits movable on said curved surfaces having their rear faces concaved and having extensions projecting below the plane of their cutting edges adapted to contact with the curved surfaces, a cross head engaging the extensions of the reaming bits from below, a spring rod extending into the central bore of the reamer body, a spring in said central bore arranged to force the spring rod upward, and means for preventing lateral movement of the cross head.

70. In an underreamer, the combination of a reamer body having a central bore, a head block carried by the reamer body having curved surfaces adapted to receive and sustain reaming bits, reaming bits movable on said curved surfaces having their rear faces concaved to contact with the curved surfaces, a cross head engaging the reaming bits from below, a spring rod extending into the central bore of the reamer body having its lower end secured to the cross-head, a spring for moving the spring rod, and means for limiting the downward movement of the spring rod.

71. In an underreamer, the combination of a reamer body having a central bore, a head block carried by the reamer body having curved surfaces adapted to receive and sustain reaming bits, reaming bits movable on said curved surfaces having their rear faces concaved and having extensions projecting below the plane of their cutting edges adapted to contact with the curved surfaces, a cross head engaging the extensions of the reaming bits from below, a spring rod extending into the central bore of the reamer body having its lower ends secured to the cross head, a spring for moving the spring rod, and means for limiting the downward movement of the spring rod.

72. In an underreamer, the combination of a reamer body having a central bore, a head block carried by the reamer body having curved surfaces adapted to receive and sustain reaming bits, reaming bits movable on said surfaces, a cross head engaging the reaming bits from below, a spring rod extending into the central bore of the reamer body and of less length than said central bore, a spring arranged to force the spring rod upward, and a detachable connection between the spring rod and cross head.

73. In an underreamer, the combination of a reamer body having a central bore, a head block carried by the reamer body having curved surfaces adapted to receive and sustain reaming bits, reaming bits movable on said curved surfaces having their rear faces concaved, a cross head engaging the reaming bits from below, a spring rod extending into the central bore of the reamer body of less length than said central bore and having its lower end detachably secured to the cross head and a spring for forcing the spring rod upward.

74. In an underreamer, the combination of a reamer body having a central bore, a head block carried by the reamer body having curved surfaces adapted to receive and sustain reaming bits, reaming bits movable on said curved surfaces having their rear faces concaved to contact with the curved surfaces, a cross head engaging the reaming bits from below, a spring rod extending into the central bore of the reamer body having its lower end secured to the cross head, means for preventing lateral movement of the cross head, and means for limiting the downward movement of the spring rod.

75. In an underreamer, the combination of a reamer body having an axial bore, a head block carried by the reamer body having curved surfaces adapted to receive and sustain reaming bits, reaming bits movable on said curved surfaces having their rear faces concaved and having extensions projecting below the plane of their cutting edges adapted to contact with the curved surfaces, a cross head having a central bore and having a longitudinal groove in its lower face extending across the lower end of the bore, and having a recess in said groove, a spring rod extending into the axial bore of the reamer body and having its lower end slotted and extending through the central bore of the cross head, and a cross pin extending through the slotted end of the spring rod and adapted to rest in the recess in the lower face of the cross head.

76. A reaming bit for underreaming having its inner face concaved and extending downward below the plane of its cutting edge.

77. A reaming bit for underreaming having its inner face concaved and having an extension projecting downward below its cutting edge, the forward face of the extension being oblique to the chord of the arc of the curve of the inner face.

78. In an underreamer, the combination of a reamer body, a head block carried by the reamer body having curved surfaces adapted to receive and sustain reaming bits, said surfaces being curved in vertical cross-section and also curved in horizontal cross-section, and reaming bits movable on said curved surfaces having their rear faces concaved.

79. The combination of a reamer body recessed in its lower portion to form opposite housings, a head block carried by the reamer body between said housings having curved surfaces adapted to receive and sustain reaming bits, said surfaces being curved in vertical cross-section and also curved in horizontal cross-section, of reaming bits movable on said curved surfaces having their rear faces concaved, said rear faces being extended below the plane of the cutting edges.

80. The combination of a reamer body recessed to form opposite housings, a head block between said housings having curved surfaces adapted to receive and sustain reaming bits, said housings being extended below said head block and connected by a web, a bit carried by said extensions, reaming bits movable on said curved surfaces, guide ribs in the housings for the reaming bits extending below the head block, the web connecting the housings having an opening therein below the lower end of the guide ribs of a size sufficient to permit the reaming bits to be inserted and removed through it.

81. The combination of a reamer body recessed to form opposite housings, a head block between said housings having curved surfaces adapted to receive and sustain reaming bits, said housings being extended below said head block and connected by a web, a bit carried by said extensions, reaming bits movable on said curved surfaces, a cross head movable toward and from said head block adapted to overlap and contact with the lower ends of the reaming bits, means for moving said cross head upward, the web connecting the housings below the head block having an opening therein adapted to permit the reaming bits and cross head to be inserted and removed through it.

82. The combination of a reamer body recessed to form opposite housings, a head block between said housings having curved surfaces adapted to receive and sustain reaming bits, said housings being extended below said head block and connected by a web, a bit carried by said extensions, reaming bits movable on said curved surfaces, a cross head movable toward and from said head block adapted to overlap and contact with the lower ends of the reaming bits, guide ribs carried by the housings for guiding the reaming bits and cross head in their movement, means for moving said cross head upward, the web connecting the housings below the head block having an opening adapted to permit the reaming bits and cross head to be inserted and removed through it.

This specification signed and witnessed this 19th day of October A. D. 1909.

JOHN C. SWAN.

In the presence of—
CHAS. E. RIORDON,
A. P. GREELEY.